(12) United States Patent
Talat et al.

(10) Patent No.: US 10,038,616 B2
(45) Date of Patent: Jul. 31, 2018

(54) MANAGING CLASSIFIED NETWORK STREAMS

(71) Applicant: Microsoft Corporation, Redmond, WA (US)

(72) Inventors: Ahmed Talat, Seattle, WA (US); Vibhor Bhatt, Seattle, WA (US); Jeff Sinnemaki, Seattle, WA (US); Alexei Aleksenko, Seattle, WA (US); Ilia Sacson, Seattle, WA (US); Jeffrey C. Fuller, Seattle, WA (US); Milena Salman, Seattle, WA (US); Madhusudhan Ravi, Seattle, WA (US); Mohammed Karam, Seattle, WA (US); Neel Jain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 14/497,313

(22) Filed: Sep. 25, 2014

(65) Prior Publication Data

US 2016/0094427 A1 Mar. 31, 2016

(51) Int. Cl.
*G06F 15/173* (2006.01)
*H04L 12/26* (2006.01)
(Continued)

(52) U.S. Cl.
CPC ...... *H04L 43/0894* (2013.01); *H04L 41/0213* (2013.01); *H04L 67/322* (2013.01);
(Continued)

(58) Field of Classification Search
None
See application file for complete search history.

(56) References Cited

U.S. PATENT DOCUMENTS 5,481,312 A 1/1996 Cash et al.
6,041,354 A 3/2000 Biliris et al.
(Continued)

FOREIGN PATENT DOCUMENTS

EP 1096742 A1 * 5/2001 ............. H04L 47/10

OTHER PUBLICATIONS

International Search Report and Written Opinion for Application PCTAJS2015/051951, dated Dec. 21, 2015.
(Continued)

*Primary Examiner* — Phyllis A Book

(57) ABSTRACT

Embodiments relate to classifying network streams and regulating behavior of the streams based on their respective classes. One technique for managing streams involves analyzing applications, obtaining indicia of features of the applications, and using those features to infer classes to which streams of the applications may be assigned. Another technique involves deploying beacon nodes at the edge of a network. The beacon nodes inform a stream manager about network conditions such as latencies with regard to network boundaries or regions. Another embodiment for facilitating management of streams involves a subscription service for UDP applications. A UDP application may subscribe to the service, which may be provided by an operating system hosting the application. Events are published to any subscribed UDP applications to inform the UDP applications of changes in networking conditions. The UDP applications, in turn, may adapt their internal transmission control logic.

18 Claims, 7 Drawing Sheets

(51) Int. Cl.
  *H04L 12/24* (2006.01)
  *H04L 29/06* (2006.01)
  *H04L 29/08* (2006.01)
  *H04L 12/801* (2013.01)
  *H04L 12/851* (2013.01)

(52) U.S. Cl.
  CPC ............ *H04L 69/16* (2013.01); *H04L 47/196* (2013.01); *H04L 47/2441* (2013.01)

(56) References Cited

U.S. PATENT DOCUMENTS

| | | | |
|---|---|---|---|
| 6,807,667 B1* | 10/2004 | Bar | H04L 67/322 709/320 |
| 6,931,630 B1* | 8/2005 | Cotner | G06F 8/70 717/126 |
| 6,990,531 B2 | 1/2006 | Vange | |
| 7,895,353 B2 | 2/2011 | Jansson | |
| 8,005,957 B2 | 8/2011 | Marr et al. | |
| 8,045,458 B2 | 10/2011 | Alperovitch et al. | |
| 8,121,117 B1 | 2/2012 | Amdahl et al. | |
| 2001/0032232 A1 | 10/2001 | Zombek | H04L 1/1635 709/201 |
| 2001/0047423 A1* | 11/2001 | Shao | H04L 12/5693 709/235 |
| 2003/0152096 A1 | 8/2003 | Chapman | |
| 2004/0257994 A1* | 12/2004 | Paskett | H04L 12/5695 370/230 |
| 2005/0021806 A1 | 1/2005 | Richardson et al. | |
| 2007/0280105 A1 | 12/2007 | Barkay et al. | |
| 2010/0010974 A1 | 1/2010 | Chieu et al. | |
| 2010/0042565 A1* | 2/2010 | Akerman | H04L 43/0852 706/20 |
| 2011/0185052 A1* | 7/2011 | Nakahira | H04L 41/083 709/223 |
| 2011/0276699 A1 | 11/2011 | Pedersen | |
| 2012/0039332 A1* | 2/2012 | Jackowski | H04L 47/2441 370/389 |
| 2012/0278678 A1* | 11/2012 | Kruglick | H04L 1/0056 714/752 |
| 2013/0014040 A1* | 1/2013 | Jagannathan | G06Q 50/01 715/765 |
| 2014/0297805 A1* | 10/2014 | Chaplot | H04L 65/608 709/219 |
| 2014/0321290 A1* | 10/2014 | Jin | H04L 47/2441 370/241 |
| 2015/0016249 A1* | 1/2015 | Mukundan | H04L 47/125 370/230 |
| 2015/0215804 A1* | 7/2015 | Ideses | H04W 28/02 370/230 |

OTHER PUBLICATIONS

"Background Intelligent Transfer Service", Published on: Aug. 2002 Available at: https://www.google.co.in/url?sa=t&rct=j&q=&esrc=s&source=web&cd=2&cad=rja&uact=8&ved=0CCEQFjAB&url=http %3A%2F%2Fdownload.microsoft.com%2Fdownload%2Fb%2F3%2Fd%2Fb3d8e8ea-8c3f-4962-8a01-478b33f44e15%2FBITS.

"Brocade IronWare OS Powers", In White Paper, Oct. 5, 2010, 8 pages.

Davies, Joseph., "The Cable Guy QoS Support in Windows", Published on: Feb. 2007 Available at: http://technet.microsoft.com/en-us/magazine/2007.02.cableguy.aspx.

Shalunov, et al., "Low Extra Delay Background Transport (LEDBAT)", Published on: Dec. 2012, Available at: https://tools.ietf.org/html/rfc6817.

Posey, Brien M., QoS in Windows Server 2012 (part 1), http://www.windowsnetworking.com/articles-tutorials/windows-server-2012/QoS-Windows-Server-2012-Part1.html, 4 pages, Aug. 30, 2012.

Posey, Brien M., QoS in Windows Server 2012 (part 2), http://www.windowsnetworking.com/articles-tutorials/windows-server-2012/QoS-Windows-Server-2012-Part2.html, 5 pages, Aug. 27, 2012.

Posey, Brien M., QoS in Windows Server 2012 (part 3), http://www.windowsnetworking.com/articles-tutorials/windows-server-2012/QoS-Windows-Server-2012-Part3.html, 8 pages, Oct. 23, 2012.

International Search Report, Application PCT/US2015/051953, dated Jan. 14, 2016.

"Second Written Opinion Issued in PCT Application No. PCT/US2015/051951", dated Aug. 16, 2016, 6 pages.

"International Preliminary Report on Patentability Issued in PCT Application No. PCT/US2015/051951", dated Nov. 2, 2016, 7 pages.

\* cited by examiner

120

| profile-class mappings | | | | |
|---|---|---|---|---|
| feature | class-A | class-B | class-C | class-D |
| localport=8080 | .1 | .8 | .5 | .2 |
| process name="foobar" | .1 | .8 | .5 | .2 |
| links-> "wmvdecod.dll" | .4 | .9 | 0 | .2 |
| background process | 0 | 0 | -.5 | 0 |
| parent process = "widgetd" | 0 | .8 | 0 | 0 |
| remoteport=123 | .5 | .5 | 0 | 0 |
| ... | ... | ... | ... | ... |

122

| application-class mappings | |
|---|---|
| firefox | B |
| skype | A |
| ftp | D |
| dropbox | E |
| ... | ... |

FIG. 2

MANAGING CLASSIFIED NETWORK STREAMS

RELATED APPLICATIONS

This application is related to U.S. patent application Ser. No. 14/497,315, titled "NETWORK CLASSIFICATION FOR APPLICATIONS", filed Sep. 25, 2014, which is incorporated herein by reference.

BACKGROUND

When multiple applications on a computing device share the same limited network resources on or external to the computing device, various techniques have been used to attempt to balance the networking needs of those applications. Computer users and applications usually prefer certain trade-offs and prioritizations among applications consuming network resources. However, in practice, prior techniques for sharing network access often have not optimally realized those preferences and priorities. For example, a user of a device may prefer that Voice over IP (VoIP) calls on their device have low network latency and that web browsing on the device be snappy and responsive. The user also may prefer that background bulk network transfers, such as cloud synchronizations and operating system updates, yield their consumption of the device's network resources in a way that enables satisfactory foreground performance and maintains reasonable progress.

In addition to often failing to satisfactorily share network access, prior access-sharing techniques have often not been convenient for software developers to access or implement. For example, while Quality of Service (QoS) facilities can be helpful, they are often not available or are not implemented in a uniform manner. Most QoS technology occurs below the application level and therefore may not be reliably manipulable by applications. Most QoS approaches, Differentiated Services for instance, depend on the behavior and support of the network between two endpoints. Such support may not exist on all network paths. Regarding convenience, network sharing behavior has also been implemented within applications, but this has usually required complex network programming with little or no direct coordination between applications. Not only is it duplicative for different applications to implement their own network-sharing logic, but the different resource-sharing behaviors of applications may conflict.

While there are protocols such as LEDBAT (Low Extra Delay Background Transport) that are implemented by operating systems to allow applications to implement specific types of network-consuming behavior, coding to leverage such a protocol may increase the cost and overhead of developing an application and may make a developer less likely to use such a protocol. In addition, widely deployed low-priority TCP (Transport Control Protocol) mechanisms like LEDBAT have shortcomings and often do not provide an ideal user experience (see Internet Engineering Task Force Request for Comments 6297 for other examples). The LEDBAT protocol, for instance, only restricts TCP send windows and has no effect on the receive stream, yet most client-side Internet traffic is inbound. Even when a mechanism like LEDBAT is available without requiring complex developer coding, it may not be possible for an operating system or network stack to determine that an application should use such a mechanism. In other words, user and application intent regarding network resource conflicts has been difficult to infer and applications have rarely specified their network priorities. Nor has sharing of a device's network resources been implemented in a way that is consistent among competing applications without being susceptible to problems such as the "latecomer" phenomena (e.g., see Request For Comments 6817, section 4.4).

Techniques related to implementing and leveraging classified network streams are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to classifying network streams and regulating behavior of the streams based on their respective classes. One technique for managing streams involves analyzing applications, obtaining indicia of features of the applications, and using those features to infer classes to which streams of the applications may be assigned. Another technique involves deploying beacon nodes at the edge of a network. The beacon nodes inform a stream manager about network conditions such as latencies with regard to network boundaries or regions. Another embodiment for facilitating management of streams involves a subscription service for UDP applications. A UDP application may subscribe to the service, which may be provided by an operating system hosting the application. Events are published to any subscribed UDP applications to inform the UDP applications of changes in networking conditions. The UDP applications, in turn, may adapt their internal transmission control logic.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 2 shows examples of profile-class mappings and application-class mappings.

DETAILED DESCRIPTION

The related patent application referenced in the Background section describes techniques for classifying network streams and regulating use of network resources accordingly. Described herein are related methods for managing classified streams. This description will begin with an explanation of how an application's streams may be implicitly classified when the application does not explicitly classify its streams. A technique of using network-edge signals to improve network resource allocation is discussed next. Various other techniques are then discussed, including how to provide a notification service for UDP (User Datagram Protocol) applications, how to use send and receive windows to assist with regulating streams, and others.

The above-referenced patent application describes how streams for carrying network traffic may be explicitly classified by applications, for instance by using an application programming interface (API) provided by an operating system. While the approach of having an application explicitly classify its network streams is effective for aligning the application's preferences with the operating system's management of network resources, this explicit classification approach may not always be practical. For example, an application or program that has already been coded and compiled without taking advantage of stream classification facilities would, absent a shim or other work-around, most likely need to be rewritten, recompiled, retested, and redistributed. For many reasons, modifying an application may not be possible or practical.

Figure 1:
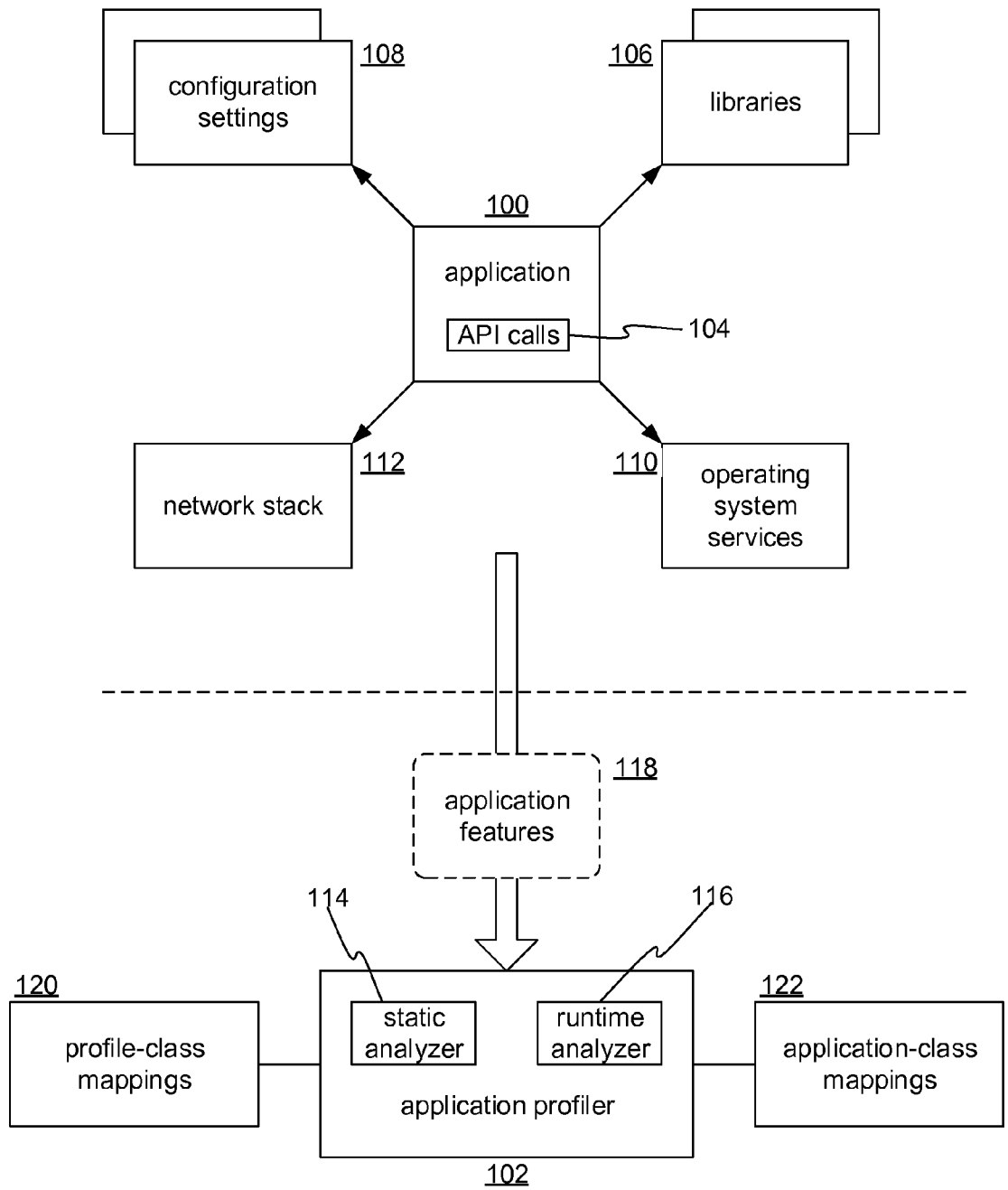
FIG. 1 shows an arrangement for automatically or implicitly classifying applications or streams.

FIG. 1 shows an arrangement for automatically or implicitly classifying applications or streams. An application 100 running on a computing device typically uses various resources of the computing device or its operating system. These traits of an application, among others, may be used by an application profiler 102 to attempt to determine a default stream classification for the application. For this explanation, the application 100 represents any arbitrary code or software that might be running on a computing device. The application 100 may have various static and dynamic features observable to the operating system. For instance, the application 100 may issue application programming interface (API) calls 104 to invoke or link libraries 106, to access system or application configurations settings 108, to interact with operating system services 110, to interact with a network stack 112, and so forth.

The application profiler 102 may have a static analyzer 114 and/or a dynamic runtime analyzer 116. Either or both of these components may be used to determine which API calls 104 are issued by the application 100. Runtime API calls 104 may be identified by hooks, event listeners, or other run-time intercepts, and the runtime analyzer 116 is notified. API calls 104 may also be identified by static analysis performed by the static analyzer 114, either just prior to executing the application, at a time of installing the application, during a periodic maintenance procedure, etc. The static analysis may involve identifying linked-to libraries 106 (perhaps identified in an application manifest or in a special section of an executable file), dependencies on known operating system files, parsing configuration files or settings, etc.

Other features of the application 100 may also be collected by the application profiler 102. For example, the application profiler 102 may determine: whether the application is configured to run as a background or foreground process, for example, based on whether a terminal is associated with the application; whether the application access multimedia hardware available on its host computing device (thus suggesting a streaming class); types of content flowing into the application (e.g. hypertext markup language (HTML) code that includes a multimedia hyperlink or content), registration with a multimedia scheduler of the operating system, a network port or protocol associated with a stream, etc. Any pieces of information ascertainable about the application 100 may serve as hints about what network classifications, if any, would be appropriate for the application. In one embodiment, a remote network service may be able to provide classifications. For example, the application profiler 102 may send an identifier of an application to the service and may receive, in response, a classification provided based on metadata about the application obtained from a managed software distribution service (i.e., an online software "store"). In any case, the collected application features 118 are received by the application profiler 102 and used to attempt to determine a class for the application 100.

In one embodiment, the application profiler 102 may perform an algorithm to determine a most likely network stream class that is to be associated with the application 100. The application profiler 102 may have a set of profile-class mappings 120 that map application features to a set of predefined classes. That is, the profile-class mappings 120 may indicate which features correspond to which classes. FIG. 2 shows an example of the profile-class mappings 120 and the application-class mappings 122. In this example, application features are assigned weights for different stream classes. The application profiler 102 may also maintain application-class mappings 122 to track which applications are associated with which stream classes. Both of these mappings will be discussed with reference to FIG. 3.

Figure 3:
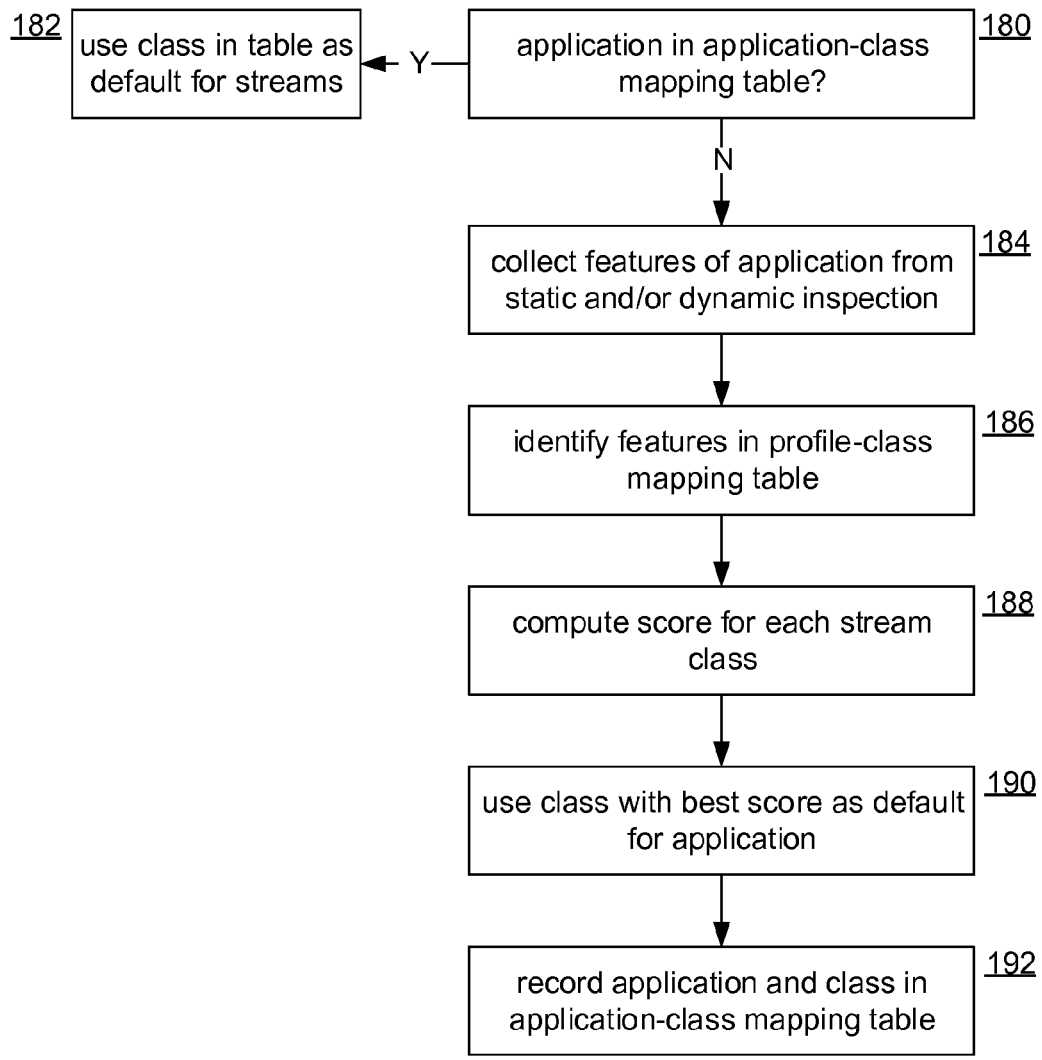
FIG. 3 shows a process for selecting a stream class using profile-class mappings and application-class mappings.

FIG. 3 shows a process for selecting a stream class using the profile-class mappings 120 and the application-class mappings 122. At step 180 the application profiler 102 receives a request to classify a target application or a stream thereof. The request might be initiated by any type of event, such as an application starting execution, an application being installed, an iteration of a background maintenance process, an application's interaction with a stream, traffic beginning to flow on the stream, forming a stream or initiating a network connection for a stream, a determination that network resources are sufficiently constrained, or others. The request may be initiated by a stream manager that manages network streams, for example, when recalibrating managed streams. In one embodiment, only applications that are determined to not use a stream classification API are implicitly classified.

At step 180, the application-class mappings 122 are referenced to determine if the target application is already associated with a particular class, then at step 182 that class is used as a default class for streams of the target application. That is, streams of the target application will be managed by a stream manager (in particular, with respect to regulation of consumption of local network resources) according to the class that is already associated with the target application as indicated in the application-class mappings 122.

If, at step 180, it is determined that the target application is not already associated with a stream class, then additional steps are performed to implicitly classify the target application. At step 184, application features are collected as described above. At step 186, the profile-class mappings 120 are consulted to identify any features therein that are features of the target application. For example, if the target application uses TCP (transmission control protocol) port 8080, then the first row of the profile-class mappings may be used. In one embodiment, a running score is maintained for each of the potential classes that could be selected from a classification model. As features of the target application are matched in the profile-class mappings, the corresponding weights are added to the corresponding class scores. When all of the target application's features have been processed, at step 190 the class having the highest resulting score is selected as a default class for the target application. The class with the highest score is presumably the class that best matches the behavior or performance preferences of the target application. In other words, the scores of the respective classes indicate how well the target application's features fit the profiles of the various stream classes provided by the operating system. Approaches other than scoring may be used. For instance, a system of prioritizing features may be used (e.g., "use of libraryZ is always class C"), a combination of scoring and Boolean logic rules, may be used, etc. Regardless of how one or more target application features or traits are mapped to a class, the default class selected for the application may, at step 192, be stored in the application-class mappings 122. The next time the target application is processed, the application-class mappings 122 will cause the application profiler 102 to again use the same default class.

Other methods for implicit application or stream classification may be used. For example, a list of user settings may be maintained by the operating system, and a user interface may allow a user to associate classes with specific applications. In another embodiment, network behavior of applications may be tracked and analyzed to determine classes that applications should have. For instance communication patterns (e.g., bursty, long-duration) may be matched to particular classes. In yet another embodiment, if implicit class-application associations are stored and re-used, such associations may be re-evaluated or deleted after a period of time has passed. Moreover, if a previously classified application begins to use an explicit API for stream classification, then any previous implicit association with a class may be removed or overridden.

Figure 4:
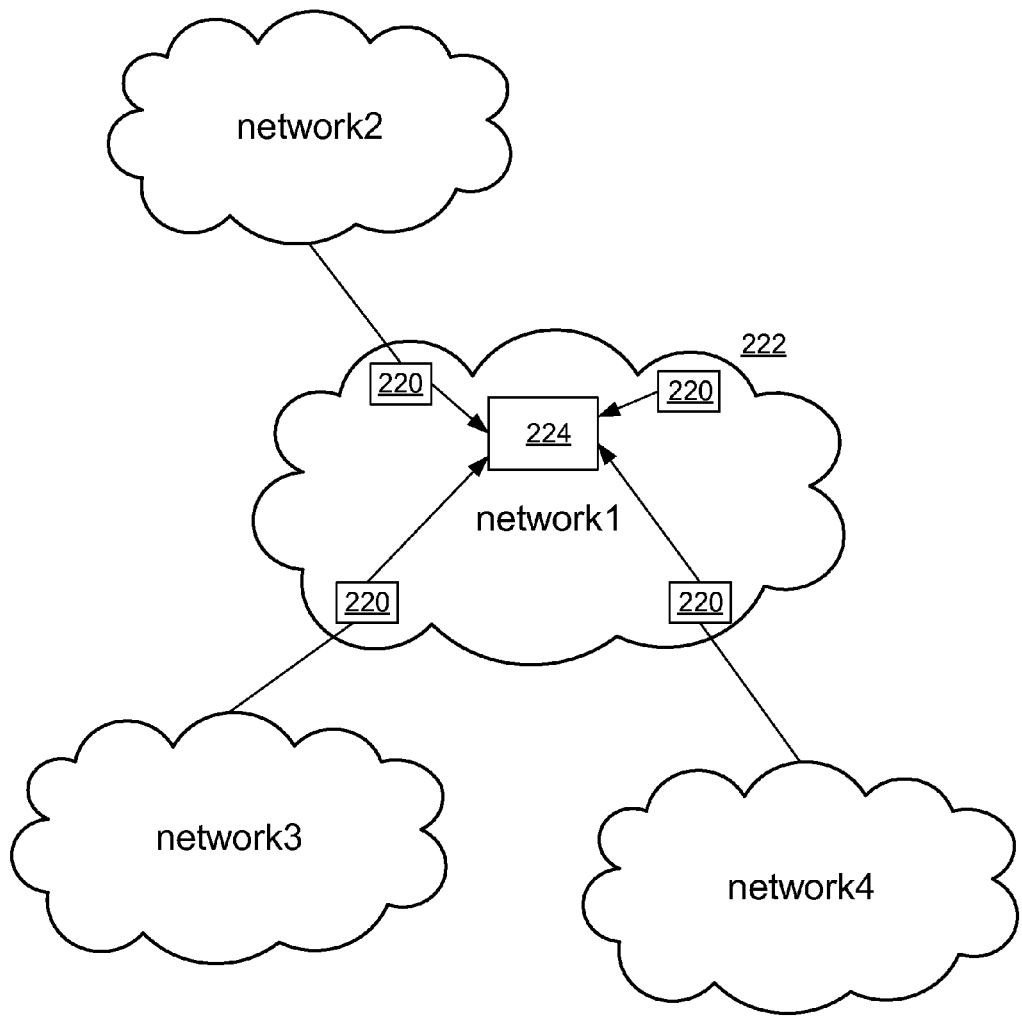
FIG. 4 shows beacon nodes that may provide network information usable by a stream manager to help regulate streams for compliance with classes thereof.

FIG. 4 shows beacon nodes 220 that may provide network information usable by a stream manager to regulate streams for compliance with classes thereof. As discussed in the above-referenced related patent application, a stream manager may be implemented in an operating system to regulate streams' consumption of the local host's network resources. The beacon nodes 220 may be thought of as extending the local operating system's visibility about the network.

In one embodiment, it may be helpful for a stream manager to have information about local network conditions, and in particular the "last mile" of connectivity. In other words, the stream manager might regulate streams and contention between streams with improved efficiency or results by throttling streams based on edge network information. In this embodiment, a network, for instance a first network 222 operated by a large entity, may have beacon nodes 220 at the edge of the first network 222. The beacon nodes 220 may be implemented as new processes running on border gateways or on servers residing near a network edge, as dedicated server machines near the network edge, etc. The beacon nodes 220 may record network conditions and report those conditions back to a collecting service 224. In particular, latencies between nodes within the first network 222 may be observed and reported, as well as latencies to nodes outside the first network 222. In embodiment, known external nodes may be polled to estimate the added latency caused by communication with nodes on external networks. Moreover, the latency information may indicate different latencies at different edges of the first network 222. It may also be helpful to help identify which traffic is crossing the Internet. Non-Internet may have low latency, whereas Internet traffic may have high latency.

The edge-provided latency information may be used in various ways by a local stream manager to regulate streams. A local stream manager may obtain latency information from the collecting service 224 and use that latency information to regulate streams. In particular, when a new stream is initiated, a baseline network latency (or other property) may be obtained. The edge-related latency information may be used to set initial stream baselines to values that facilitate better stream management. The latency information may also be used for setting initial or ongoing sizes of congestion windows or send and receive windows. To elaborate on how edge-related latency information can be used in LEDBAT-like protocols, consider that the LEDBAT protocol, for example, depends on a global base latency, or the minimum latency possible through a network. The LEDBAT protocol does not mix information between streams; all streams are managed based on the base latency. Edge latency information can be used to disambiguate streams going through different networks or gateways, since the streams may have significantly varying base latencies. The edge-provided latency information can help with the disambiguation by providing a stream with a known remote endpoint and gateway (such as an Internet server going through the local machine's Internet Service Provider).

Figure 5:
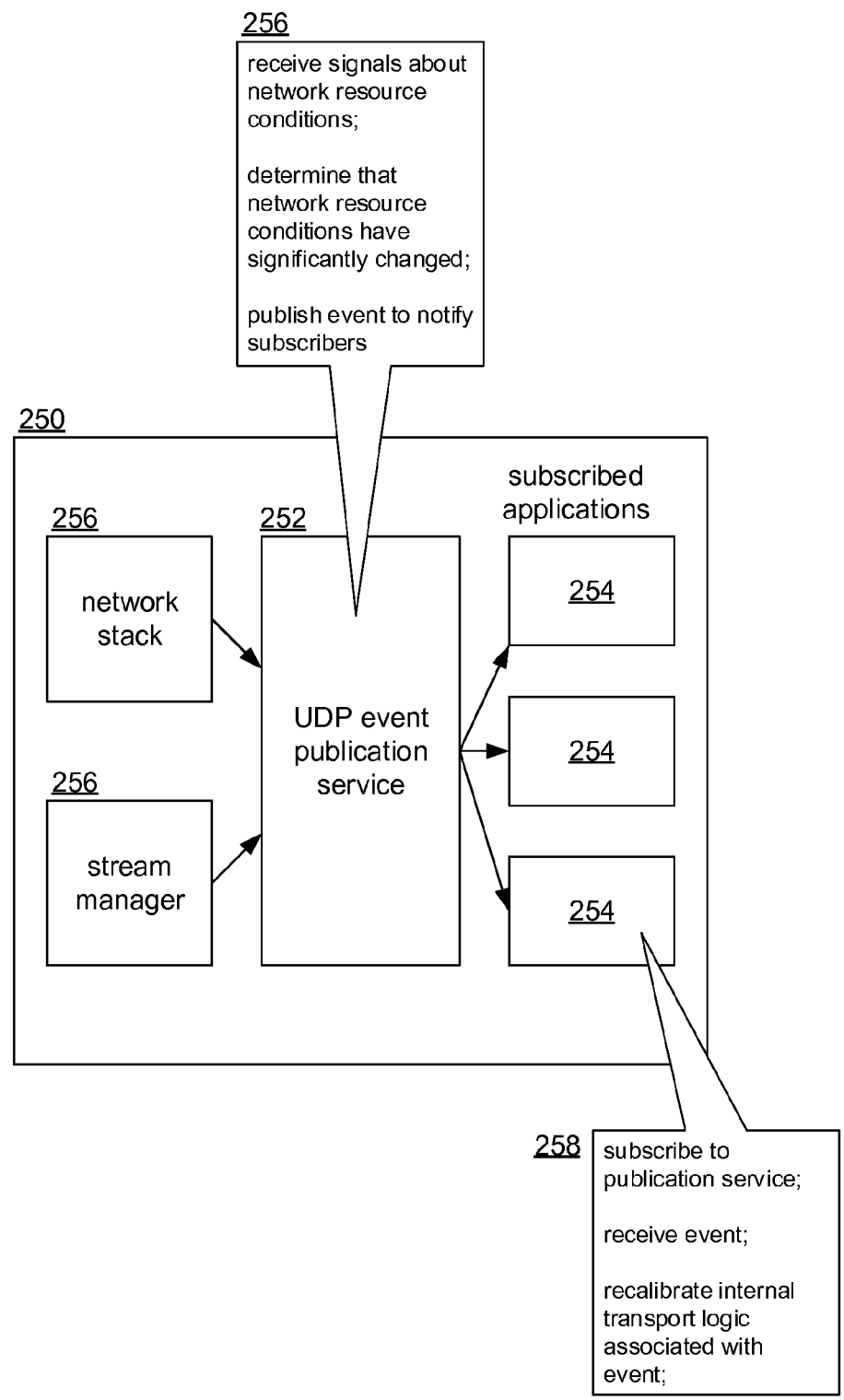
FIG. 5 shows an embodiment for helping user datagram protocol (UDP) applications improve their network behavior.

FIG. 5 shows an embodiment for helping UDP applications to improve their network behavior. Applications that use the UDP protocol often implement their own transmission controls, such as packet sequencing, retransmission, and error checking. In some implementations, it may not be practical to manage UDP streams as classified streams. However, applications often have traffic regulating logic that might benefit from being informed of conditions that pertain to network performance and use of network resources. A computing device 250 may be provided with an event publication service 252. The event publication service 252 may be an operating system service available to applications 254, which may subscribe to the publication service by an appropriate API call.

The event publication service 252 may perform a process 256. The process 256 may involve receiving signals about network resource conditions. In effect, any type of information that a stream manager 258 might use for managing streams can potentially be passed on to the event publication service for publication. In one embodiment, the event publication service 252 may collect network performance information from a network stack 254 and make its own determinations about when network conditions have changed in a way that merits notifying the subscribed applications 254. In another embodiment, the stream manager 256 may periodically push out updates about current latency and bandwidth performance of the computing device 250.

In turn, an application 254 may have custom logic 258 to handle notifications from the event publication service. For instance, after subscribing to the event publication service, an application may receive an event. The event, which might be conveyed by some form of interprocess-communication, might indicate merely that network conditions have changed and a recalibration is called for. The event might also have specific information about network conditions, such as current bandwidth or latency performance, current congestion levels, recommended window sizes, etc. The receiving application will then invoke custom code for recalibrating its network behavior. For instance, if the event indicates that one or more stream classes are underperforming or overperforming, the application may correspondingly decide to increase or decrease its current traffic throughput, suspend communication, or make other adjustments designed to improve its own behavior or to help allow better management of streams by the stream manager 256. In cases where an application implements its own transport-type features, such as a send window, a receive window, a congestion window, etc., the application may adjust those features in response to a published event.

Figure 6:
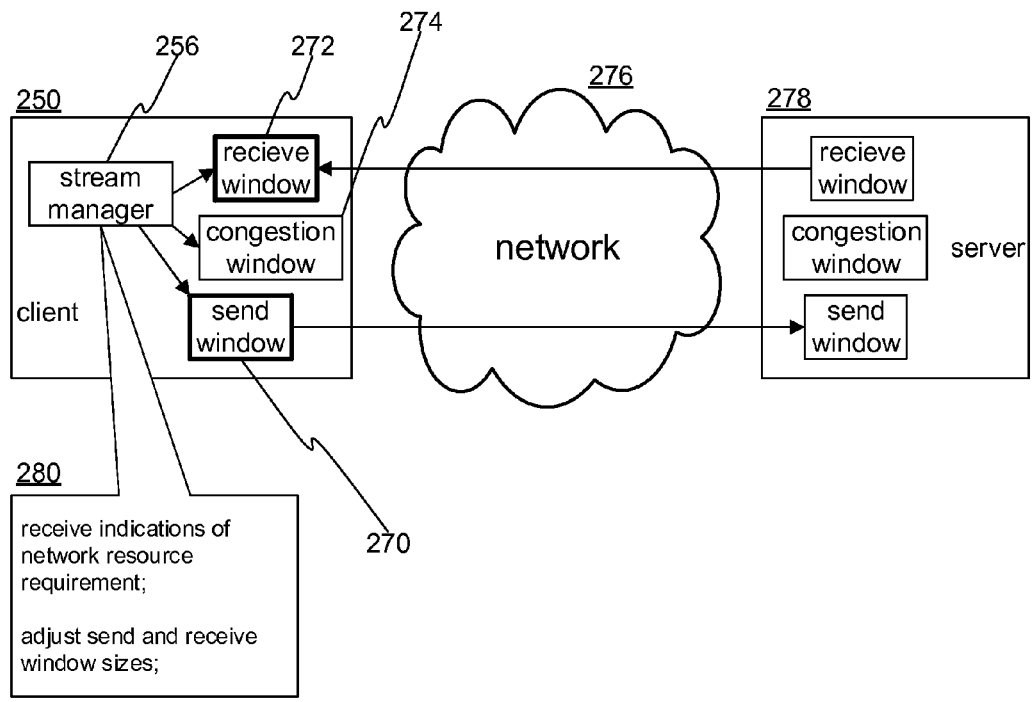
FIG. 6 shows an embodiment where TCP send and receive window sizes are used by a stream manager to regulate streams according to their classes.

FIG. 6 shows an embodiment where TCP send and receive window sizes are used by a stream manager to regulate streams according to their classes. The above-referenced patent application discusses a stream manager regulating network streams according to their classes. One mechanism for stream regulating is to modify the sizes of the TCP send and receive windows 270, 272 that are associated with a TCP stream. When the computing device 250 is communicating via a network 276 with a remote device 278, both ends of the TCP connection may have a send and receive window. However, a receive window has not been used by a receiving device to regulate local network resources, in particular latency. Typically, some low-delay extra bandwidth (LEDBAT) implementations have assumed that remote nodes are also implementing LEDBAT or an equivalent bandwidth/latency regulation scheme. Therefore, these implementations typically only use the congestion window to regulate traffic; each side assumes that the other will do its part to regulate traffic. Adjusting sizes of the local send and receive windows 270, 272 at computing device 250 gives the stream manager 256 greater control over backing-off some streams (e.g., in a first class) when other streams (e.g., in a second and higher priority latency class) require additional responsiveness.

Specifically, the stream manager 256, when managing a stream, may perform a process 280 of receiving indications of a network resource requirement or a change in local conditions. For instance, the stream may be in a high priority latency class and the stream manager 256 might determine that the stream is at or approaching a latency requirement or threshold. To assure that a latency priority or a latency floor for the stream's class is maintained, the stream manager then adjusts both the send and receive windows 272, 274 of other streams, according to their classes. This can enable the stream manager 256 to rapidly throttle those other streams (in particular, streams in a low priority class) and allow the stream in the high priority latency class to quickly operate with low latency. In one embodiment, the sizes of the send and receive windows 272, 272 may be determined according to information about delay. For example, one-way delay may be measured using TCP timestamps. Note that the size of the congestion window 274 may also be manipulated to regulate streams according to their classes. Note also that the stream manager 256 need not directly manage windows. The stream manager 256 may communicate with the network stack and inform the network stack what the window sizes should be, and then the network stack implements those sizes.

An algorithm for window manipulation can be implemented as follows. First, a stream's window size may be resized more quickly the farther away the stream is from the latency goal of its stream class. For example, if a streams' class targets a latency of under 100 ms and the current measured latency is 400 ms, then window sizes of other streams (perhaps prioritized by class) are rapidly lowered. If the current measured latency is 150 ms, then the windows sizes are gradually decreased. In other words, rate of window size modification may be a function of the difference between the current latency and the stream's target latency. A simpler resizing approach, for instance changing windows sizes by static amounts, may cause extreme fluctuations that overshoot the target latency.

Second, a previously advertised window size is not rescinded. The remote sender is allowed to fully use any window size previously advertised, but future window size advertisements may be restricted. This may help avoid any compatibility issues with the remote sender not conforming to changes that have been previously advertised.

Third, a hard minimum window size may be maintained. In some scenarios this may be relevant for several reasons. First, if a TCP stream's window size becomes lower than 2 MSS (maximum segment size), then the TCP stream can encounter delayed ACKs and subsequent increased latency. In addition, minimum throughput logic can be implemented to avoid disconnects by either end of a stream's connection due to low throughput. For example, the some HTTP (hypertext transfer protocol) servers will disconnect an HTTP session if throughput is extremely low for several minutes, even if forward progress is being made. This is partially to avoid denial of service achieved by keeping resources utilized. To achieve this minimum throughput, a heuristic may be used to keep a moving average of throughput, and network impairment may be disabled while the throughput is below the specified minimum throughput. This may allow window sizes to grow gradually rather than instantly reverting to some former values.

Other techniques may also be used in conjunction with embodiments described herein and in the above-referenced related patent application. Concerning traffic regulation, to help with freeing up latency capacity (increasing responsiveness of streams), longer delays may be induced in low-class streams by introducing wait times before sending TCP acknowledgements (ACKs). That is, ACK delays for some streams may be intentionally extended to improve responsiveness (latency) for other streams. Similarly, for upstream traffic, the ACK-receive threshold may be extended, thereby providing longer waits before timing-out on the ACKs and potentially avoiding TCP re-transmits.

In addition, application network usage contracts may be supported by exposing a manifest of one or more tiered network requirements. Examples include an application declaratively specifying a manifest with network bandwidth and latency requirements (or classes) for a Standard Definition video tier and a different set of bandwidth and latency requirements (or classes) for a High Definition video tier for video streaming applications, as well as different fidelity levels in VOIP (voice over Internet Protocol) calls so a central controller can throttle (up and down) through different tiers according to changing network conditions.

It may also be possible to expose stream priority hints to broadband providers. Providers may use the hints to offer lower cost if an application traffic allows longer delays, and conversely may fast track traffic that has been marked appropriately.

Finally, network traffic priority (per stream classes) may be used for power management. Lower priority traffic may be delayed/dropped to save power. That is, traffic may be scheduled for delayed transmission, which may allow battery power to be saved. For example, the stream manager may inform a power management module that it need not maintain power to, or start powering, a radio specifically for a particular stream's connection.

Figure 7:
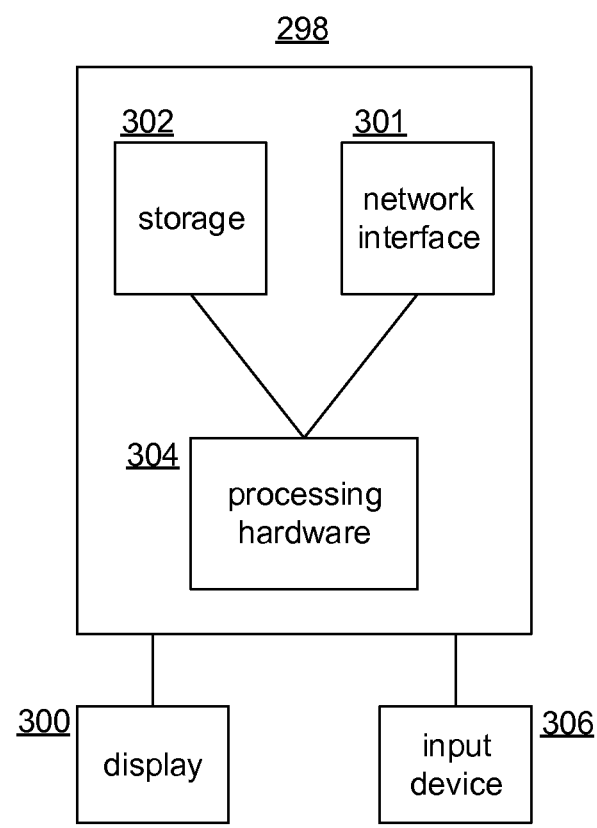
FIG. 7 shows details of a computing device.

FIG. 7 shows details of a computing device 298 on which embodiments described above may be implemented. The computing device 298 may have a display 300, a network interface 301, as well as storage 302 and processing hardware 304, which may be a combination of any one or more: central processing units, graphics processing units, analog-to-digital converters, bus chips, Field-programmable Gate Arrays (FPGAs), Application-specific Integrated Circuits (ASICs), Application-specific Standard Products (ASSPs), or Complex Programmable Logic Devices (CPLDs), etc.

The storage 302 may be any combination of magnetic storage, static memory, volatile memory, etc. The meaning of the term "storage", as used herein does not refer to signals or energy per se, but rather refers to physical apparatuses (including physical media such as magnetic storage media, optical storage media, static memory devices, etc., but not signals per se). The hardware elements of the computing device 298 may cooperate in ways well understood in the art of computing. In addition, input devices 306 may be integrated with or in communication with the computing device 298. The computing device 298 may have any form factor or may be used in any type of encompassing device. The computing device 298 may be in the form of a handheld device such as a smartphone, a tablet computer, a gaming device, a server, a rack-mounted or backplaned computer-on-a-board, a System-on-a-chip, or others. Generally, the computing device 298 will be a discrete network node or device.

Embodiments and features discussed above can be realized in the form of information stored in volatile or non-volatile computer or device readable apparatuses, with such information able to configure the computing device 298 to perform the embodiments described herein. These apparatuses may include apparatuses such as optical storage (e.g., compact-disk read-only memory (CD-ROM)), magnetic media, holographic storage, flash read-only memory (ROM), or other devices for storing digital information. The stored information can be in the form of machine executable instructions (e.g., compiled executable binary code), source code, bytecode, or other information that can be used to enable or configure computing devices to perform the embodiments described herein. This is also deemed to include at least volatile memory such as random-access memory (RAM) and/or virtual memory storing information such as central processing unit (CPU) instructions during execution of software carrying out an embodiment, as well as non-volatile devices storing information that allows a program or executable to be loaded and executed.

The invention claimed is:

1. A method performed by a single computer comprising storage, processing hardware, and a network interface, the method comprising:
   executing applications installed on the computing device, the applications comprising executable files installed on the computer and configuration settings stored on the computer, the applications having respective network streams managed by an operating system of the computer;
   automatically determining first features of the applications, respectively, and/or automatically determining second features of the applications, respectively, wherein the determining is performed by an application profiler that executes on the computer, wherein the automatically determining the first features comprises the application profiler parsing the executable files and/or the configuration settings, wherein the automatically determining the second features comprises the application profiler monitoring execution of the applications, and wherein a first and/or second feature is determined for each of the respective applications;
   accessing a mapping in the storage, the mapping comprising predefined application features and indicia of network stream classes that are implemented by the operating system of the computer, the mapping indicating which of the predefined application features are associated with which of the network stream classes, wherein the mapping is stored before the determining the first and/or second features, and wherein the predefined application features comprise at least some of the first and/or second features;
   for each of the applications, determining which of the respective first and/or second features determined by the application profiler match which of the predefined application features in the mapping, and selecting a network stream class for each of the applications based on which network stream class the mapping indicates is associated with the respectively matched predefined application feature;
   storing application classification information indicating which of the network stream classes were selected for the respective applications; and
   regulating, by the operating system of the computing device, transmission of packets of the streams by the network interface, wherein the regulating of each stream is performed according to which network stream class the application classification information indicates was selected for the corresponding application.

2. A method according to claim 1, wherein the regulating is performed by, for a given network stream associated with a given network stream class, comparing a measure of bandwidth and/or latency performance of the given network stream with a corresponding bandwidth and/or latency specification of the given network stream class.

3. A method according to claim 1 wherein the first features comprise components of the operating system determined, by the application profiler, to be referenced by the applications.

4. A method according to claim 1, wherein the second features comprise features of the applications that arise during, and as a result of, execution of the applications.

5. A method according to claim 1, wherein the predefined application features of the mapping have respective weights that are used to determine which of the network stream classes best matches identified features of an application.

6. A method according to claim 1, wherein the automatically determining the first and/or second features is performed for an application responsive to determining, from the classification information, that the application is not already associated with any network stream class that is included in the mapping.

7. A method according to claim 6, further comprising using features of the application determined by the application profiler to automatically select a network stream class for the application, and updating the classification information to indicate an association between the application and the network stream class selected therefor.

8. A method according to claim 7, further comprising storing an indication that a stream of the application has the network stream class based on the indicated association between the application and the selected network stream class.

9. A computing device comprising:
   storage hardware storing information to enable a processor, when the computing device is operating, to execute an operating system;
   a network interface;
   the processor, when the computing device is operating, coupled with memory to execute the operating system; and
   the operating system, when executing, comprising a stream manager that manages network streams that provide transmission control protocol (TCP) packets between a network and applications installed on the computing device and executed by the operating system, the stream manager implementing a pre-defined set of stream classes, wherein each network stream is associated with one of the stream classes based on associations between the stream classes and the streams;

the storage hardware storing instructions configured to form an association between a stream class and a network stream of an application by:

executing application profiling code that (i) determines a first application feature of the application by parsing configuration settings and/or an executable file of the application, and/or (ii) determines second application features of the application by monitoring execution of the application;

accessing a mapping comprising associations between predefined application features and the stream classes, the mapping indicating which predefined application features are associated with which stream classes, wherein the mapping exists prior to the forming the association between the stream class and the network stream;

forming the association between the stream class and the network stream of the application by matching a predefined application feature in the mapping with the first and/or second application feature of the application as determined by the application profiling code, and selecting the stream class based on the mapping having an association between the matched predefined application feature and the stream class;

storing the association between the stream class and the network stream; and regulating, by the operating system, transmission of the network stream by the network interface, wherein the regulating is performed based on the stored association between the stream class and the network stream.

10. A computing device according to claim 9, wherein the stream manager provides an event publication service that provides updates to applications subscribed thereto responsive to determinations that network conditions of the computing device have changed, wherein indicia of the network conditions are used by the stream manager to regulate the behavior of the network streams.

11. A computing device according to claim 9, further comprising a power management module of the operating system that controls powering of a radio according to the stream class associated with the network stream.

12. A computing device according to claim 9, wherein the operating system induces delays in the network streams according to the stream classes respectively associated with the network streams, the inducing comprising artificially delaying transmission control protocol (TCP) acknowledgments and/or extending receive-acknowledgment thresholds to avoid TCP retransmits, the receive-acknowledgment thresholds comprising periods of time before which retransmission requests are issued.

13. A computing device according to claim 9, wherein the associations between the network streams and the stream classes are based on application-class association information indicating which applications are associated with which of the stream classes.

14. Computer readable storage device storing information configured to enable a computing device to perform a process, the process comprising:

storing applications installed on the computing device, the applications comprising executable files and configuration settings stored by the storage hardware;

for each application, automatically determining respective first and/or second application features by executing an application profiler that (i) determines the first feature by parsing the executable file and/or the corresponding configuration settings of the respectively corresponding application, and/or (ii) determines the second feature by monitoring execution of the respectively corresponding application, wherein a first and/or second application feature is determined for each of the respective applications;

accessing a feature-class mapping that is stored by the storage hardware prior to the automatically determining the first and/or second application features for each respective application, the feature-class mapping comprising first indicia of predefined application features and second indicia of network application classes, wherein the feature-class mapping indicates which of the application features are associated with which of the network application classes, and wherein the predefined application features comprise at least some of the first and/or second application features;

for each of the applications, determining which of the respectively corresponding first and/or second application features correspond to which of the predefined application features of the feature-class mapping;

for each of the applications, selecting a network application class that the feature-class mapping indicates is associated with the predefined application feature determined to correspond to the first and/or second application feature of the respectively corresponding application;

storing application classification information indicating which of the network application classes were selected for the applications, respectively; and regulating, by an operating system of the computing device, transmission of packets of streams of the applications by the network interface, wherein the regulating of each stream is performed according to which network application class the application classification information indicates was selected for the respectively corresponding application.

15. Computer readable storage device according to claim 14, wherein the first and/or second features comprise process names associated with the applications, libraries linked to the applications, background execution statuses of the applications, port numbers associated with the applications, protocols used by the applications, and/or application programming interface (API) calls of the applications.

16. Computer readable storage device according to claim 14, the process further comprising computing scores for an application according to weights of the predefined application features, respectively.

17. Computer readable storage device according to claim 14, wherein the regulating is performed without the computing device performing Quality of Service marking on the streams.

18. Computer readable storage device according to claim 14, the process further comprising storing network performance parameters of the network application classes, respectively, and performing the regulating for a stream of an application according to the performance parameters of the network application class that the application classification information indicates is associated with the application.

* * * * *